2,988,505
LOW FLUID LOSS WELL FRACTURING FLUIDS
David T. Oakes, El Dorado, Ark., assignor to Monsanto Chemical Company, St. Louis, Mo., a corporation of Delaware
No Drawing. Filed Dec. 20, 1957, Ser. No. 704,010
2 Claims. (Cl. 252—8.55)

The present invention relates to well-treating compositions and, more particularly, it is directed to compositions useful for the hydraulic fracturing of formations in oil wells, gas wells, etc.

The practice of creating new flow channels and crevices by hydraulic fracturing has become widespread and has proven of great value in stimulating the production of fluids from most formations. In the art of fracturing wells, a special fluid, commonly called a fracturing fluid, is usually pumped down the well into contact with the formation to be fractured and the pressure of the fluid is increased until the formation is fractured by hydraulic pressure. It is usually desirable to incorporate a propping material, such as sand, in the fracturing fluid, whereby the sand is carried into the fracture with the fracturing fluid. After the fracture has been extended to the extent desired, the pressure in the well bore is decreased. At least a portion of the propping material is deposited in the fracture for maintaining it open and enhancing the flow of formation fluids through the fracture into the well bore.

The characteristics required of fracturing fluids have become fairly well known. The type of fracture obtained is dependent to a large extent upon the penetrating characteristics of the fracturing fluid, i.e., the extent of fracture is influenced by the fluid-loss characteristics of the fracturing fluid. Fracturing fluids giving the most desirable type of fractures are those with low penetration characteristics or low filtration rates. Another important consideration is the viscous character of the fluid. Since the fracturing medium normally carries a propping agent such as sand, the typical fracturing fluids must also possess sufficient viscosity and gel strength to support the granular propping agent while keeping a low coefficient of friction. In addition, the fluid should require, for economic reasons, only relatively inexpensive components and it should be easy to prepare in the field.

It is an object of this invention to provide an oil-base well-treating fluid. It is a further object of this invention to provide oil-base fracturing-fluid compositions which sufficiently meet all of the foregoing requirements and possess all of the desired properties. Other objects and advantages of the invention will become apparent from the following description thereof.

The well-treating compositions of this invention comprise a petroleum oil having dispersed therein a minor amount of a composition which comprises an intimate homogeneous dispersion of an oil-insoluble or sparingly oil-soluble organo phosphate, sulfate or sulfonate in an asphalt containing from about 20% to about 80% by weight of asphaltenes.

The intimate dispersion of the oil-insoluble organo phosphate, sulfate or sulfonate in the asphalt can be prepared in any convenient manner. The materials can be ground, blended together and then heated to about 240° C. to fuse the mixture. The fused mixture, after stirring, is then cooled, solidified and ground. The materials can also be individually melted with heating and the molten materials blended, cooled, solidified and ground. The materials can also be dispersed in a mutual solvent or dispersing medium and precipitated therefrom, such as by evaporation of the solvent, and the precipitate collected and ground.

The following examples are presented to illustrate the low fluid-loss characteristics of the novel well-treating compositions of this invention.

EXAMPLE I

Compositions comprising an intimate dispersion of a lube oil sulfonate in asphalt were mechanically dispersed in diesel oil and the fluid-loss characteristics of the resultant compositions determined at 80° F. and 140° F. At 80° F. the fluid loss was determined in the conventional manner by filtration using a standard API filter press closed with a Whatman No. 50 filter paper. The fluid loss was reported in cc. collected in 30 minutes at 100 p.s.i.g. At 140° F. the fluid-loss characteristics were determined in the conventional manner by filtration using a Baroid high temperature filter press closed with a Baroid No. 988 filter paper. Fluid loss was reported in cc. collected in 30 minutes at 100 p.s.i.g. The results are set forth in Table I.

*Table I*
EFFECT OF ASPHALT COMPOSITION

| Asphalt (Percent Asphaltenes) | Asphalt (gms.) | Lube Oil Sulfonates (gms.) | Diesel Oil (cc.) | Temp. (° F.) | 30-min. Fluid Loss (cc.) |
|---|---|---|---|---|---|
| Shuler Roofing Asphalt (32.5%) | 2.88 | 1.92 | 400 | 80 | 62.5 |
| Do | 2.88 | 1.92 | 400 | 140 | 24.5 |
| No. 5 Shuler Asphalt (49.3%) | 2.88 | 1.92 | 400 | 80 | 33.5 |
| Do | 2.88 | 1.92 | 400 | 140 | 51.5 |
| No. 10 Shuler Asphalt (59.6%) | 2.88 | 1.92 | 400 | 80 | 36.0 |
| Do | 2.88 | 1.92 | 400 | 140 | 39.0 |
| No. 15 Shuler Asphalt (69.2%) | 2.88 | 1.92 | 400 | 80 | 51.5 |
| Do | 2.88 | 1.92 | 400 | 140 | 37.2 |
| Ink Asphalt (50%) | 2.88 | 1.92 | 400 | 80 | 6.8 |
| Do | 2.88 | 1.92 | 400 | 140 | 7.8 |

EXAMPLE II

The procedure set forth in Example I was repeated varying the ratio of asphalt to lube oil sulfonates in the composition. The results are set forth in Table II.

*Table II*

| Ink Asphalt (gms.) | Lube Oil Sulfonates (gms.) | Ratio (Asphalt: Sulfonate) | Diesel Oil (cc.) | Temp. (° F.) | 30-min. Fluid Loss (cc.) |
|---|---|---|---|---|---|
| 1.44 | 3.36 | 3:7 | 400 | 80 | 92.0 |
| 1.44 | 3.36 | 3:7 | 400 | 140 | 82.5 |
| 1.92 | 2.88 | 4:6 | 400 | 80 | 29.5 |
| 1.92 | 2.88 | 4:6 | 400 | 140 | 53.2 |
| 2.40 | 2.40 | 5:5 | 400 | 80 | 19.5 |
| 2.40 | 2.40 | 5:5 | 400 | 140 | 33.8 |
| 2.88 | 1.92 | 6:4 | 400 | 80 | 5.0 |
| 2.88 | 1.92 | 6:4 | 400 | 140 | 12.0 |
| 3.36 | 1.44 | 7:3 | 400 | 80 | 6.6 |
| 3.36 | 1.44 | 7:3 | 400 | 140 | 14.0 |

EXAMPLE III

The procedure set forth in Example I was repeated, varying the concentration of the additive in the diesel oil. The results are set forth in Table III.

*Table III*
SYSTEM: INK ASPHALT-LUBE OIL SULFONATES (RATIO 6:4) IN DIESEL OIL

| Concentration (gms./400 cc.) | Temperature (° F.) | 30-min. Fluid Loss (cc.) |
|---|---|---|
| 4.8 | 80 | 6.8 |
| 7.2 | 80 | 4.8 |
| 9.6 | 80 | 3.7 |
| 4.0 | 140 | 16.0 |
| 4.8 | 140 | 15.5 |
| 7.2 | 140 | 12.0 |
| 9.6 | 140 | 7.3 |

EXAMPLE IV

The procedure set forth in Example I was repeated varying the petroleum oil used. The results are set forth in Table IV.

*Table IV*

SYSTEM: INK ASPHALT-LUBE OIL SULFONATES (RATIO 6:4) CONCENTRATION: 4.8 GMS. ADDITIVE TO 400 CC. OIL

| Oil (Percent Paraffins) | Temp. (° F.) | 30-min. Fluid Loss (cc.) |
|---|---|---|
| Diesel (74.5%) | 80 | 6.8 |
| Do | 140 | 7.8 |
| Cottage Grove Crude (45.4%) | 80 | 7.2 |
| Do | 140 | 8.5 |
| Smackover Select Crude (13.8%) | 80 | 3.9 |
| Do | 140 | 41.5 |

EXAMPLE V

In the actual fracturing of a well using the low fluid-loss medium of this invention, the procedure is as follows:

The well-treating composition as described herein is pumped into the well through suitable tubing or casing to the elevation of a producing formation at a substantially constant rate. Sand or some other propping agent is incorporated in the fracturing fluid as it is pumped into the well. The sand or other agent is suspended in the fracturing fluid by virtue of the viscosity characteristics of the fluid and thus is carried into the fracture when the fracturing fluid enters the formation. Pumping or injection of the dispersion into the well is continued after the fracturing fluid reaches the selected formation thus causing the bottom-hole pressure to rise until the hydrostatic bottom-hole pressure is sufficient to cause the formation to part or fracture. Upon the release of pressure, the sand holds open the fracture and provides a more permeable path for fluid flow. Fluid pressure measurements are continuously made at the surface and when fracture occurs the surface pressure decreases. Continued injection of the fluid into the fracture will extend the fracture. The pressure required to fracture the formation, commonly termed the "formation breakdown pressure," is roughly equivalent in pounds per square inch to the depth of the formation in feet.

The composition of the low fluid-loss media of this invention can be varied substantially without departing from the scope thereof. The asphalts used in the compositions of this invention are the solid or semi-solid residue after the volatile constituents of a crude oil have been removed. The asphalt may be partially oxidized and/or polymerized by heating and blowing to vary the asphaltene content. The asphalts used in preparing the composition of the invention are those which have homogeneously dispersed therein from about 20% to about 80% by weight of asphaltenes and preferably from about 40% to about 60% by weight asphaltenes. As used throughout this specification and claims, asphaltenes are that fraction of an asphalt which is insoluble in hexane, exclusive of any ash that may be present.

Any oil-insoluble or sparingly oil-soluble organo phosphate, sulfate or sulfonate can be used with the asphalts described above in preparing the novel compositions of this invention. Substantially oil-insoluble solids which can be used in the novel compositions of this invention include alkyl phosphates, alkyl sulfates, alkylaryl sulfonates, such as dodecylbenzene sulfonates, and lube oil sulfonates. The alkylaryl sulfonates and lube oil sulfonates are particularly preferred in the practice of this invention. The alkali metal salts of alkylaryl sulfonates are particularly useful although salts of other monovalent or divalent cations can be used. Alkylaryl sulfonates having molecular weights from about 200 to about 1000 result in highly useful fluid-loss compositions. Insoluble or sparingly-soluble (in oil) lube oil sulfonates useful in the practice of this invention (which are those used in the preceding examples) are the salts of the sulfonated hydrocarbons which are extracted from the sludge produced attendant to the sulfonation of the lubricating-oil-fraction of a crude oil.

The petroleum oil which may be used as the carrier in the improved oil-treating compositions of this invention can be any petroleum hydrocarbon liquid. Crude oil which is normally available in the vicinity of the well-working operation can be used. Refined petroleum products, such as kerosene, pale oil, diesel oil, fuel oil and so forth can also be used. Lease crudes which contain emulsified water may be used as the dispersing medium.

In the novel compositions of this invention, the ratio of the asphalt-asphaltene fraction to the substantially oil-insoluble organo phosphate, sulfate or sulfonate can be substantially varied. Ratios of asphalt-asphaltene fraction:substantially oil-insoluble organo phosphate, sulfate or sulfonate ranging from about 1:3 to about 4:1 are applicable with a range of from about 2:3 to about 4:1 being preferred.

The total solids concentration in the well-treating composition can be substantially varied. The oil-base dispersion can contain as low as 0.5% by weight of the above described solids and as high as approximately 25% by weight of the above described solids. Concentrations ranging from about 1% to about 15% by weight of total composition are particularly useful.

The well-treating compositions of this invention may be used as such as described or they may be incorporated as an additive to impart increased viscosity and/or reduced fluid loss in any oil-base fluid used in well-treating operations.

What is claimed is:

1. A well fracturing fluid composition consisting essentially of a petroleum oil having dispersed therein from about 0.5 to about 25% by weight of a composition consisting essentially of an intimate homogeneous dispersion of a substantially oil insoluble alkylaryl sulfonate having a molecular weight from about 200 to about 1000 in an asphalt containing from about 20% to about 80% by weight of asphaltenes; wherein the weight ratio of asphalt to said substantially oil insoluble material is in the range of from about 1:3 to about 4:1.

2. A composition as described in claim 1 wherein said alkylaryl sulfonate is a mineral lubricating oil sulfonate.

References Cited in the file of this patent
UNITED STATES PATENTS

| | | |
|---|---|---|
| 2,223,027 | Dawson et al. | Nov. 26, 1940 |
| 2,667,224 | Howard | Jan. 26, 1954 |
| 2,779,735 | Brown et al. | Jan. 29, 1957 |
| 2,793,996 | Lummus | May 28, 1957 |
| 2,811,207 | Clark | Oct. 29, 1957 |